US009415751B2

(12) United States Patent
Taniguchi et al.

(10) Patent No.: US 9,415,751 B2
(45) Date of Patent: Aug. 16, 2016

(54) INTEGRATED FLAT TIRE REPAIR KIT

(71) Applicant: SUMITOMO RUBBER INDUSTRIES, LTD., Kobe-shi, Hyogo (JP)

(72) Inventors: Norio Taniguchi, Kobe (JP); Tsutomu Kono, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 144 days.

(21) Appl. No.: 14/370,919

(22) PCT Filed: Dec. 18, 2012

(86) PCT No.: PCT/JP2012/082752
§ 371 (c)(1),
(2) Date: Jul. 7, 2014

(87) PCT Pub. No.: WO2013/114751
PCT Pub. Date: Aug. 8, 2013

(65) Prior Publication Data
US 2015/0000786 A1    Jan. 1, 2015

(30) Foreign Application Priority Data

Feb. 3, 2012   (JP) ................. 2012-022224

(51) Int. Cl.
*B60S 5/04* (2006.01)
*B29C 73/02* (2006.01)
*B29C 73/16* (2006.01)
*B29L 30/00* (2006.01)

(52) U.S. Cl.
CPC ............... *B60S 5/043* (2013.01); *B29C 73/025* (2013.01); *B29C 73/166* (2013.01); *B29L 2030/00* (2013.01)

(58) Field of Classification Search
CPC ...... B29C 71/25; B29C 71/16; B29C 71/166; B29L 2030/00
USPC ................. 141/37, 38, 67, 105, 383
See application file for complete search history.

(56) References Cited

U.S. PATENT DOCUMENTS 2,731,195 A * 1/1956 Blome .......................... 141/383
3,515,181 A * 6/1970 Sperberg ........................ 141/38
3,669,159 A * 6/1972 Owens, Jr. ....................... 141/1

(Continued)

FOREIGN PATENT DOCUMENTS

DE       101 06 468 A1   8/2002
DE   20 2007 016 242 U1   3/2008

(Continued)

*Primary Examiner* — Mark A Laurenzi
*Assistant Examiner* — Andrew Schmid
(74) *Attorney, Agent, or Firm* — Birch, Stewart, Kolasch & Birch, LLP

(57) ABSTRACT

An extraction cap of an integrated flat tire repair kit is provided with; an air-dedicated flow passage that normally connects the inlet mouth portion for taking compressed air to the outlet mouth portion without passing through the bottle container; and a puncture repair-dedicated flow passage that is connected to the inlet mouth portion instead of the air-dedicated flow passage by switching means. The puncture repair-dedicated flow passage comprises a first flow passage portion that connects the inlet mouth portion to the inside of the bottle container and a second flow passage portion that connects the inside of the bottle container to the outlet mouth portion.

14 Claims, 9 Drawing Sheets

(56) References Cited

U.S. PATENT DOCUMENTS

| | | | |
|---|---|---|---|
| 4,270,585 A * | 6/1981 | Mette | 141/37 |
| 5,924,463 A * | 7/1999 | Hsu et al. | 141/313 |
| 6,019,145 A * | 2/2000 | Savidge | 141/38 |
| 6,283,172 B1 * | 9/2001 | Thurner | 141/38 |
| 6,431,225 B1 * | 8/2002 | Dudley | 141/38 |
| 6,766,834 B1 * | 7/2004 | Eckhardt | 141/38 |
| 6,789,581 B2 * | 9/2004 | Cowan et al. | 141/38 |
| 7,028,720 B2 * | 4/2006 | Eckhardt | 141/38 |
| 7,389,800 B2 * | 6/2008 | Hickman et al. | 141/26 |
| 7,891,385 B2 * | 2/2011 | Yanagi et al. | 141/38 |
| 8,020,588 B2 * | 9/2011 | Wang | 141/38 |
| 8,201,586 B2 * | 6/2012 | Yoshida et al. | 141/38 |
| 8,281,820 B2 * | 10/2012 | White | 141/37 |
| 8,297,321 B2 * | 10/2012 | Chou | 141/38 |
| 8,505,591 B2 * | 8/2013 | Eckhardt | 141/38 |
| 8,517,063 B2 * | 8/2013 | Kanenari et al. | 141/38 |
| 8,596,310 B2 * | 12/2013 | Senno et al. | 141/38 |
| 8,627,857 B2 * | 1/2014 | Chou | 141/38 |
| 8,640,745 B2 * | 2/2014 | Ji | 141/38 |
| 8,671,995 B2 * | 3/2014 | Chou | 141/38 |
| 8,733,407 B2 * | 5/2014 | Eckhardt | 141/38 |
| 8,746,292 B2 * | 6/2014 | Lolli et al. | 141/38 |
| 8,857,477 B2 * | 10/2014 | Lolli et al. | 141/38 |
| 2003/0024596 A1 * | 2/2003 | Kojima et al. | 141/38 |
| 2005/0284536 A1 * | 12/2005 | Kojima et al. | 141/38 |
| 2006/0272731 A1 * | 12/2006 | Takeda | 141/38 |
| 2008/0264540 A1 * | 10/2008 | Dowel | 152/509 |
| 2009/0301602 A1 * | 12/2009 | Lolli et al. | 141/38 |
| 2010/0071801 A1 * | 3/2010 | Sekiguchi | 141/38 |
| 2010/0108185 A1 * | 5/2010 | Chou | 141/38 |
| 2010/0108186 A1 * | 5/2010 | Yoshida et al. | 141/38 |
| 2010/0186849 A1 * | 7/2010 | Yoshida et al. | 141/38 |
| 2011/0041951 A1 * | 2/2011 | Lolli | 141/38 |
| 2011/0290372 A1 * | 12/2011 | Dowel | 141/37 |
| 2013/0000777 A1 * | 1/2013 | Kojima et al. | 141/38 |
| 2013/0092286 A1 * | 4/2013 | Chou | 141/38 |
| 2013/0138146 A1 * | 5/2013 | Kojima et al. | 606/213 |
| 2013/0199666 A1 * | 8/2013 | Nakao et al. | 141/38 |
| 2013/0284313 A1 * | 10/2013 | Kojima et al. | 141/38 |
| 2014/0099428 A1 * | 4/2014 | Paasch | 427/8 |
| 2014/0190589 A1 * | 7/2014 | Kowalski | 141/38 |
| 2014/0190590 A1 * | 7/2014 | Taniguchi et al. | 141/38 |
| 2014/0209208 A1 * | 7/2014 | Taniguchi et al. | 141/38 |
| 2014/0224380 A1 * | 8/2014 | Kono | 141/37 |
| 2014/0224381 A1 * | 8/2014 | Nakao et al. | 141/37 |
| 2014/0261878 A1 * | 9/2014 | Jhou | 141/38 |
| 2014/0366981 A1 * | 12/2014 | Taniguchi et al. | 141/38 |
| 2015/0000786 A1 * | 1/2015 | Taniguchi et al. | 141/38 |

FOREIGN PATENT DOCUMENTS

| | | | |
|---|---|---|---|
| DE | 10 2007 003 667 A1 | 7/2008 | |
| EP | 528216 A1 * | 2/1993 | B67C 3/28 |
| JP | 2000108215 A * | 4/2000 | B29C 73/02 |
| JP | 2005-199618 A | 7/2005 | |
| JP | 2007-168418 A | 7/2007 | |
| JP | 2008-307861 A | 12/2008 | |
| JP | 2010-1047 A | 1/2010 | |
| JP | 2010-274450 A | 12/2010 | |

* cited by examiner

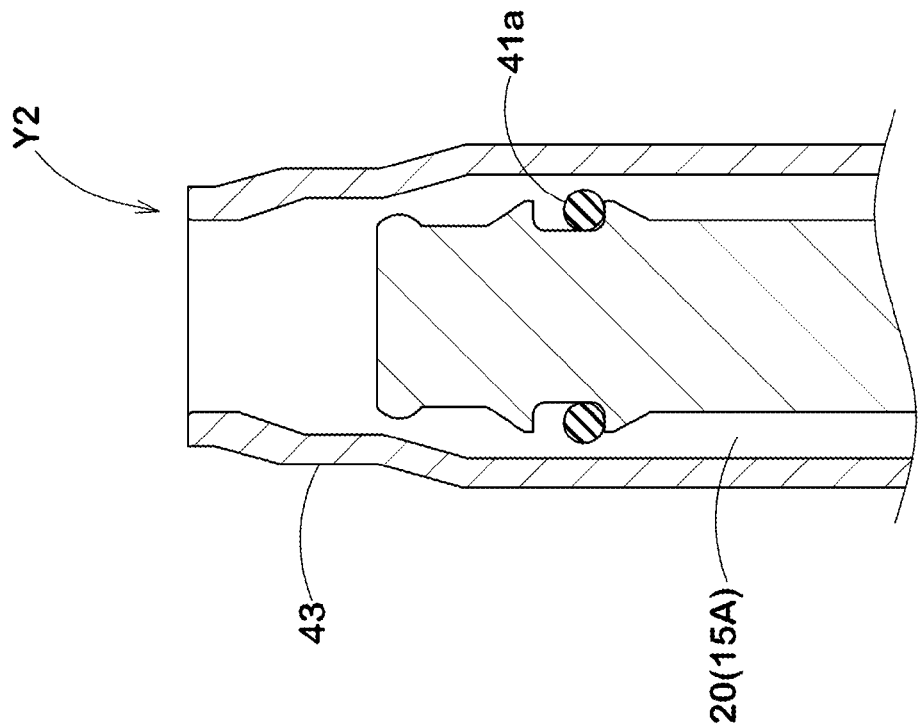
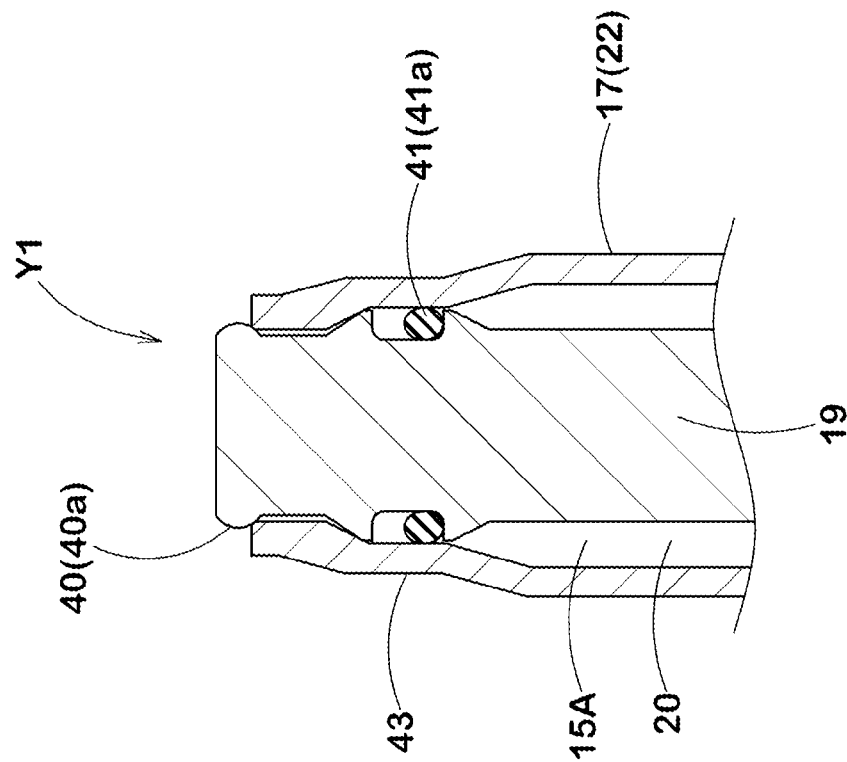

INTEGRATED FLAT TIRE REPAIR KIT

TECHNICAL FIELD

The present invention relates to an integrated flat tire repair kit that is switchable between puncture repair and charging only compressed air so as to enhance versatility and improve operability.

BACKGROUND ART

For example, the following patent document 1 describes an integrated flat tire repair kit that is switchable between puncture repair and charging only compressed air. The integrated flat tire repair kit has characteristics of high versatility. As shown in FIG. 9, a housing case (a) of the integrated flat tire repair kit houses therein a compressor (b), a bottle unit (c), and a manual transfer switch (d). The bottle unit (c) includes a bottle container (c1) storing a puncture repair fluid therein, and an extraction cap (c2) secured to a mouth portion of the bottle container (c1). The manual transfer switch (d) is disposed between the compressor (b) and the extraction cap (c2).

The extraction cap (c2) includes an inlet mouth portion (e1) to take in compressed air, and an outlet mouth portion (e2) to sequentially discharge the puncture repair fluid and the compressed air from the bottle container (c1) upon an intake of the compressed air. The manual transfer switch (d) includes an inflow port (Pi) to be coupled to the compressor (b), and an outflow port to be communicated with the inflow port (Pi). The outflow port includes selectively switchable first and second outflow ports (Po1, Po2). The first outflow port (Po1) is to be coupled to the air inlet mouth portion (e1). A hose dedicated to compressed air (f) is to be coupled to the second outflow port (Po2). A hose dedicated to puncture repair (g) is to be coupled to the second outlet mouth portion (e2).

The above puncture repair kit employs the two hoses (f, g). Hence, there is a risk of a misoperation, such as a mistake of a coupling destination of the hoses. The two hoses (f, g) make it difficult to achieve downsizing and cost reductions. Additionally, the transfer switch (d) is disposed separately, resulting in complicated internal piping of the puncture repair kit. This lowers assembly work efficiency and makes it difficult to achieve downsizing and cost reductions of the integrated flat tire repair kit.

RELATED ART DOCUMENT

Patent Document

Patent document 1: Japanese Unexamined Patent Application Publication No. 2010-274450.

DISCLOSURE OF THE INVENTION

Problems to be Solved by the Invention

It is an object of the present invention to provide an integrated flat tire repair kit that is basically configured so that an extraction cap includes therein an air-dedicated flow passage and a puncture repair-dedicated flow passage so as to permit switching between the air-dedicated flow passage and the puncture repair-dedicated flow passage. The integrated flat tire repair kit has a simplified internal structure so as to enhance assembly work efficiency, and requires only one hose so as to improve operability and contribute to downsizing and cost reductions of the integrated flat tire repair kit.

Means of Solving the Problems

To solve the above problem, according to claim 1 of the present invention, an integrated flat tire repair kit comprises: a compressor housed in a housing case and configured to discharge compressed air; and a bottle unit housed in the housing case and comprising an extraction cap secured to a mouth portion of a bottle container storing a puncture repair fluid. The extraction cap comprises fan inlet mouth portion configured to take the compressed air from the compressor into the extraction cap, an outlet mouth portion configured to discharge the taken compressed air or both of the compressed air and the puncture repair fluid to outside the extraction cap, an air-dedicated flow passage configured to be coupled to the inlet mouth portion in normal time so as to allow the inlet mouth portion to communicate with the outlet mouth portion without passing through an interior of the bottle container, a puncture repair-dedicated flow passage comprising a first flow passage portion and a second flow passage portion, the first flow passage portion being configured to be coupled to the inlet mouth portion instead of the flow passage dedicated to air by switching means so as to allow the inlet mouth portion to communicate with the interior of the bottle container, the second flow passage portion being configured to allow the interior of the bottle container to communicate with the outlet mouth portion, a first on-off valve interposed in the second flow passage portion and configured to close the second flow passage portion in the normal time, and the switching means.

In the switching means comprises a switching cap and is configured to be operated upon securing the switching cap to the housing case so as to allow a coupling destination of the inlet mouth portion to be switched from the air-dedicated flow passage to the puncture repair-dedicated flow passage, and the switching means is configured to release the first on-off valve so as to open the second flow passage portion.

In claim 2, the housing case comprises a securing recessed portion disposed on a bottom portion of the housing case, and the switching means is configured to be operated upon securing the switching cap to the securing recessed portion.

In claim 3, the extraction cap comprises a cap body integrally comprising a barrel portion comprising a tubular portion whose upper end is secured to the mouth portion of the bottle container, and a bottom portion configured to close a lower end of the tubular portion, and a support portion extending upward from the bottom portion and coaxially with the tubular portion so as to reach the interior of the bottle container, and a mobile body externally inserted in and held by the support portion so as to be vertically movable relative to the support portion.

The first on-off valve is disposed in the mobile body so as to be integrally movable with the mobile body. An upward movement of the mobile body allows a coupling destination switching from the air-dedicated flow passage to the puncture repair-dedicated flow passage, and allows release of the first on-off valve.

In claim 4, an inner wall surface of the tubular portion comprises a large diameter wall portion having a large inner diameter, and a small diameter wall portion having a small inner diameter and being continuous with a lower side of the large diameter wall portion with a step portion interposed therebetween. The mobile body comprises a piston portion configured to be airtightly contacted with the small diameter wall portion, and a sheath pipe portion extending from the piston portion and coaxially with the piston portion, The piston portion comprises a circumferential groove shaped recessed portion disposed on an outer peripheral surface of the piston portion, and a through hole portion disposed below the recessed portion and configured to permit communication between an outer peripheral surface side and an inner peripheral surface side of the piston portion. The air-dedicated flow passage is defined by the recessed portion. And, the first flow passage portion of the puncture repair-dedicated flow passage comprises the through hole portion and a first clearance portion between the sheath pipe portion and the support portion, and the second flow passage portion of the puncture repair-dedicated flow passage comprises the recessed portion and a second clearance portion between the piston portion and the large diameter wall portion.

In claim 5, the switching means comprises a projected piece projectedly extending downward from a lower end of the mobile body and passing through the bottom portion, and upon securing the switching cap to the housing case, the switching cap is configured to contact with a lower end of the projected piece so as to push up the mobile body.

In claim 6, the first on-off valve comprises an upper seal ring and a lower seal ring disposed on an outer peripheral surface of the piston portion and respectively located above and below the recessed portion, and wherein in the normal time, the upper seal ring and the lower seal ring are brought into close contact with the small diameter wall portion so as to close the second flow passage portion, and the upward movement of the mobile body allows the upper seal ring to be opposed to the large diameter wall portion so as to open the second flow passage portion.

In claim 7, an upper end of the support portion and an upper end of the sheath pipe portion are located above a fluid surface of the puncture repair fluid.

In claim 8, a second on-off valve configured to close the first flow passage portion in the normal time is disposed at an upper end portion of the support portion, and the second on-off valve is configured to open the first flow passage portion upon the upward movement of the mobile body.

Effects of the Invention

According to the present invention, the extraction cap includes therein the air-dedicated flow passage that is to be coupled to the inlet mouth portion in the normal time, and the puncture repair-dedicated flow passage that is to be coupled to the inlet mouth portion. The puncture repair-dedicated flow passage is to be coupled to the inlet mouth portion instead of the air-dedicated flow passage by the switching means. Thus, the integrated flat tire repair kit is configured to permit switching between the air-dedicated flow passage and the puncture repair-dedicated flow passage.

It is therefore ensured to simplify piping and structure in the integrated flat tire repair kit so as to enhance assembly work efficiency. Additionally, only one hose needs to be coupled to an object. This eliminates the probability of erroneous piping and also improves operability. The simplified piping and structure in the integrated flat tire repair kit and the reduction in the number of hoses facilitate downsizing and cost reductions of the integrated flat tire repair kit.

The first on-off valve interposed in the second flow passage portion of the puncture repair-dedicated flow passage is to close the second flow passage portion in the normal time. It is therefore ensured to prevent the puncture repair fluid in the bottle container from leaking during storage, or the like.

BRIEF DESCRIPTION OF THE DRAWINGS

FIGS. 7(A) and 7(B) are respectively cross-sectional views in enlarged dimension a state of a sheath pipe portion in normal time and a state of the sheath pipe portion at the time of switching.

MODES FOR CARRYING OUT THE INVENTION

An embodiment of the present invention is described in detail below.

Figure 1:
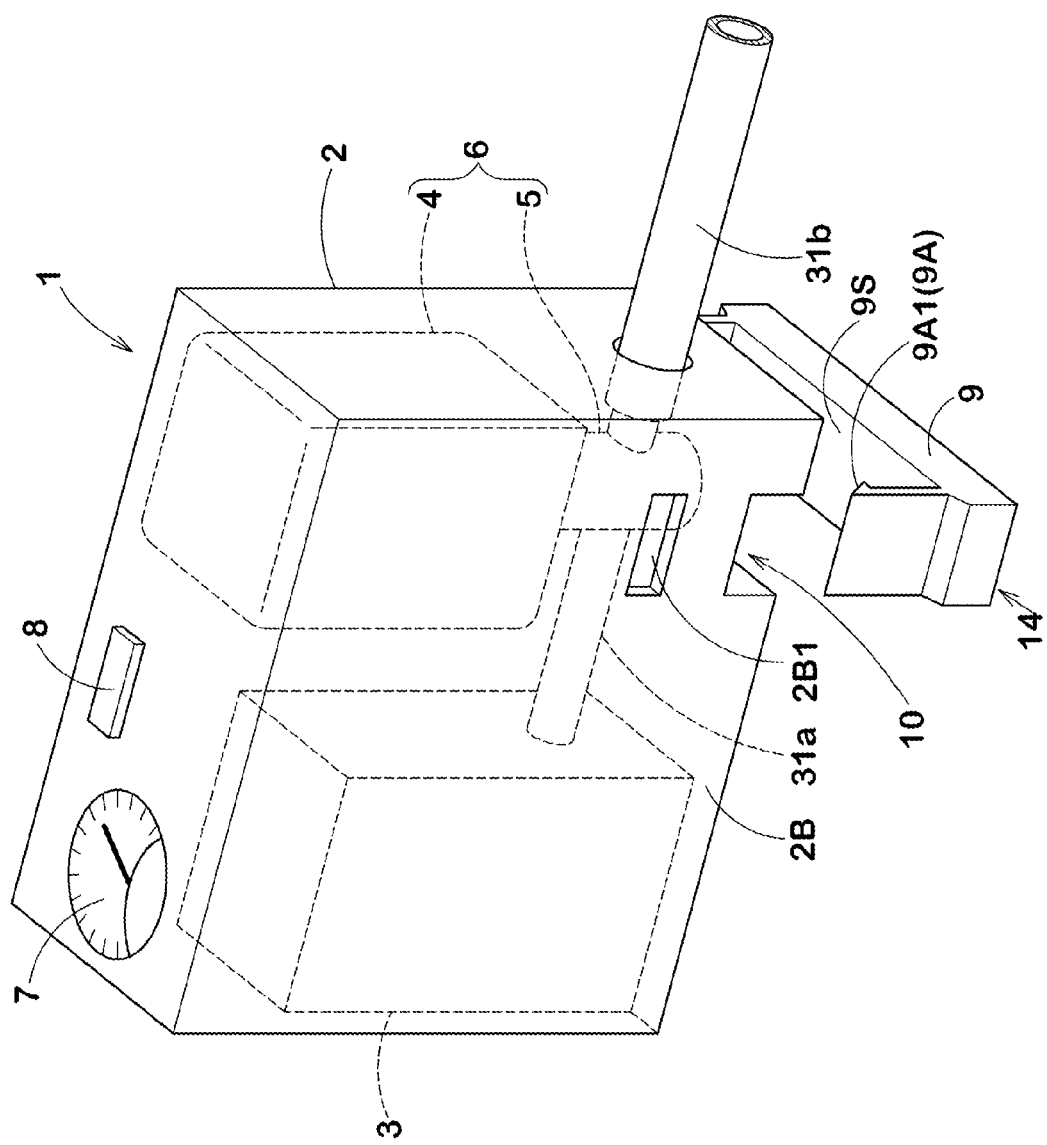
FIG. 1 is a perspective view showing an embodiment of an integrated flat tire repair kit according to the present invention.

FIG. 1 is a perspective view showing an embodiment of an integrated flat tire repair kit 1 according to the present embodiment. The integrated flat tire repair kit 1 includes a housing case 2. The housing case 2 houses and holds therein, a compressor 3 to discharge compressed air, and a bottle unit 6 with an extraction cap 5 secured to a bottle container 4 storing a puncture repair fluid T. The compressor 3 and the bottle unit 6 are disposed in, for example, a lateral direction.

No specific restriction is imposed on the compressor 3, and one having a well-known structure to be operated by an automobile battery is suitably employed.

The housing case 2 has a rectangular box shape. In the present embodiment, a pressure gauge 7 and a power switch 8 are disposed on an upper surface of the housing case 2.

Figure 2:
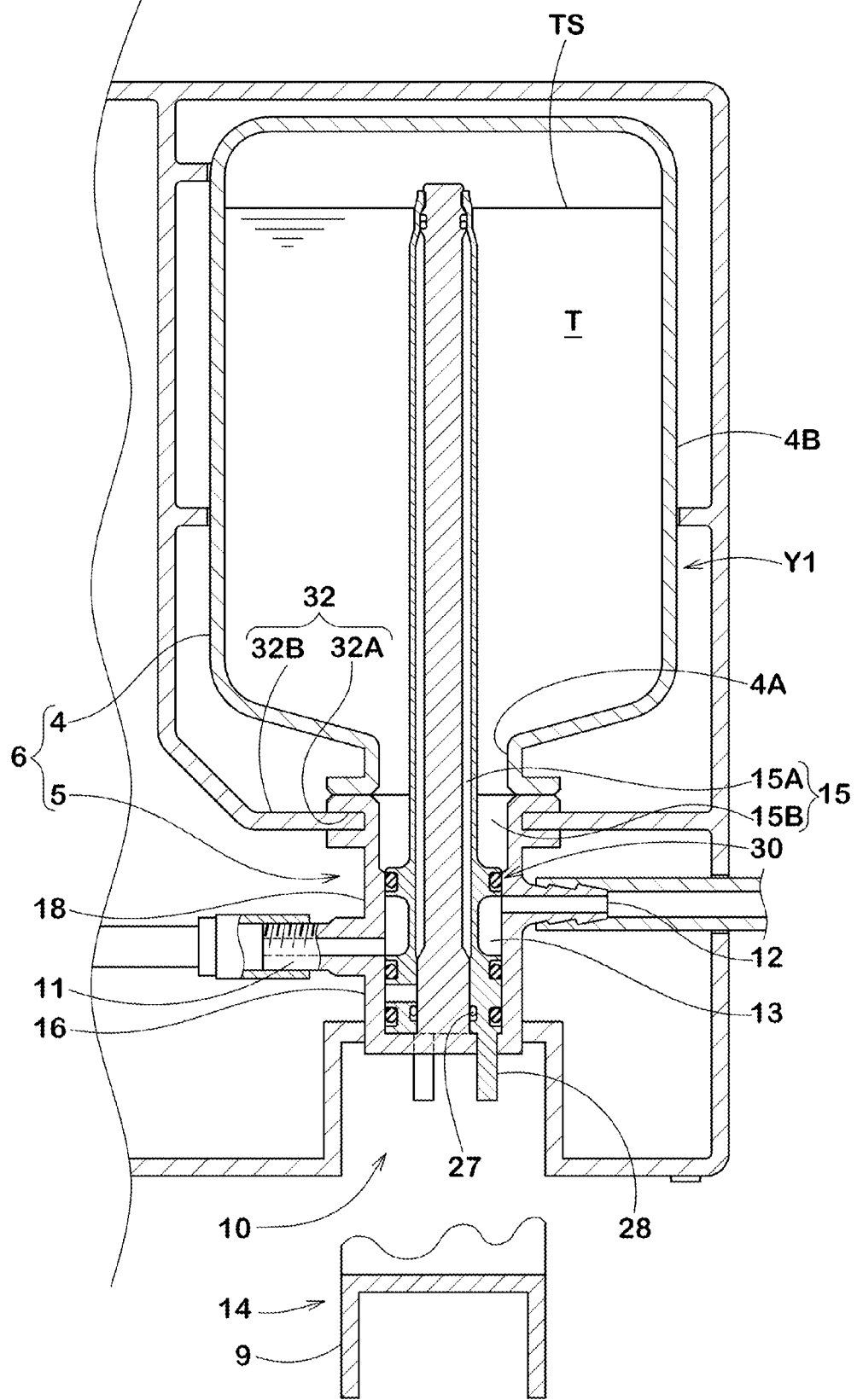
FIG. 2 is a cross-sectional view showing in enlarged dimension a bottle unit in normal time.

As shown in FIG. 2, the bottle unit 6 is made up of the bottle container 4 and the extraction cap 5. The bottle container 4 includes a bottomed container portion 4B to store the puncture repair fluid T, and a small-diameter cylindrical shaped mouth portion 4A that projects from a lower end of the container portion 4B.

The extraction cap 5 includes an inlet mouth portion 11, an outlet mouth portion 12, an air-dedicated flow passage 13, switching means 14, and a puncture repair-dedicated flow passage 15. The inlet mouth portion 11 is to take the compressed air in the compressor 3 into the extraction cap 5. The outlet mouth portion 12 is to discharge only the taken compressed air or both of the compressed air and the puncture repair fluid T to the outside. The air-dedicated flow passage 13 is to be coupled to the inlet mouth portion 11 in normal time. The air-dedicated flow passage 13 is to allow the inlet mouth portion 11 to communicate with the outlet mouth portion 12 without passing through the interior of the bottle container 4. The puncture repair-dedicated flow passage 15 is to be coupled to the inlet mouth portion 11 instead of the air-dedicated flow passage 13 by the switching means 14.

The puncture repair-dedicated flow passage 15 is made up of a first flow passage portion 15A that allows the inlet mouth portion 11 to communicate with the interior of the bottle container 4, and a second flow passage portion 15B that allows the interior of the bottle container 4 to communicate with the outlet mouth portion 12. The second flow passage portion 15B includes a first on-off valve 30 that is to close the second flow passage portion 15B so as to prevent leakage of the puncture repair fluid T in the normal time.

Figure 5:
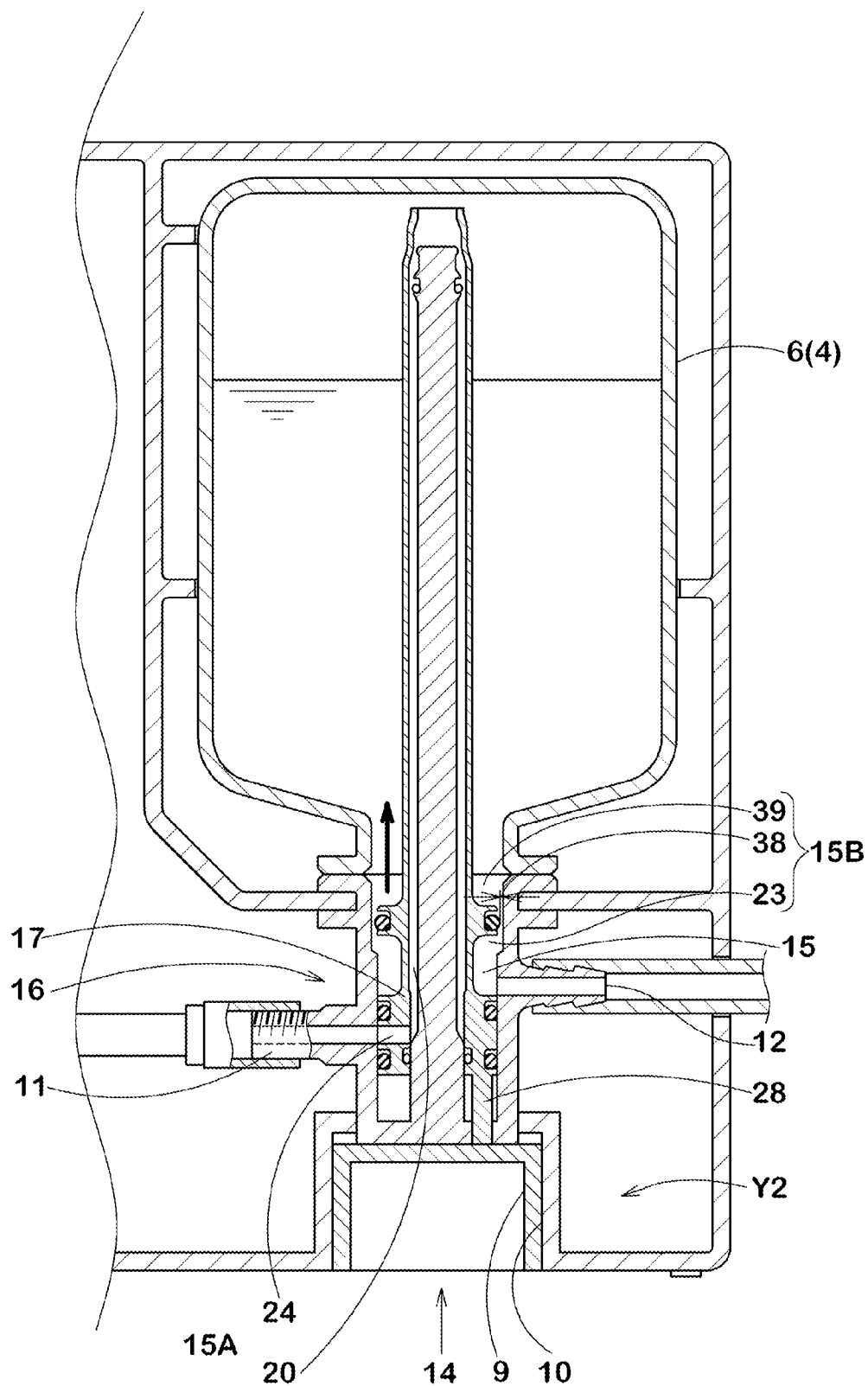
FIG. 5 is a cross-sectional view showing in enlarged dimension the bottle unit at the time of switching.

As shown in FIGS. 1 and 2, the switching means 14 includes a switching cap 9. The integrated flat tire repair kit 1 is to be operated upon securing the switching cap 9 to a securing recessed portion 10 disposed on a bottom portion of the housing case 2. That is, in the integrated flat tire repair kit 1, the second flow passage portion 15B is to be opened at the time when a coupling destination of the inlet mouth portion 11 is switched from the air-dedicated flow passage 13 to the puncture repair-dedicated flow passage 15, and when the first on-off valve 30 is released as shown in FIG. 5.

Figure 3:
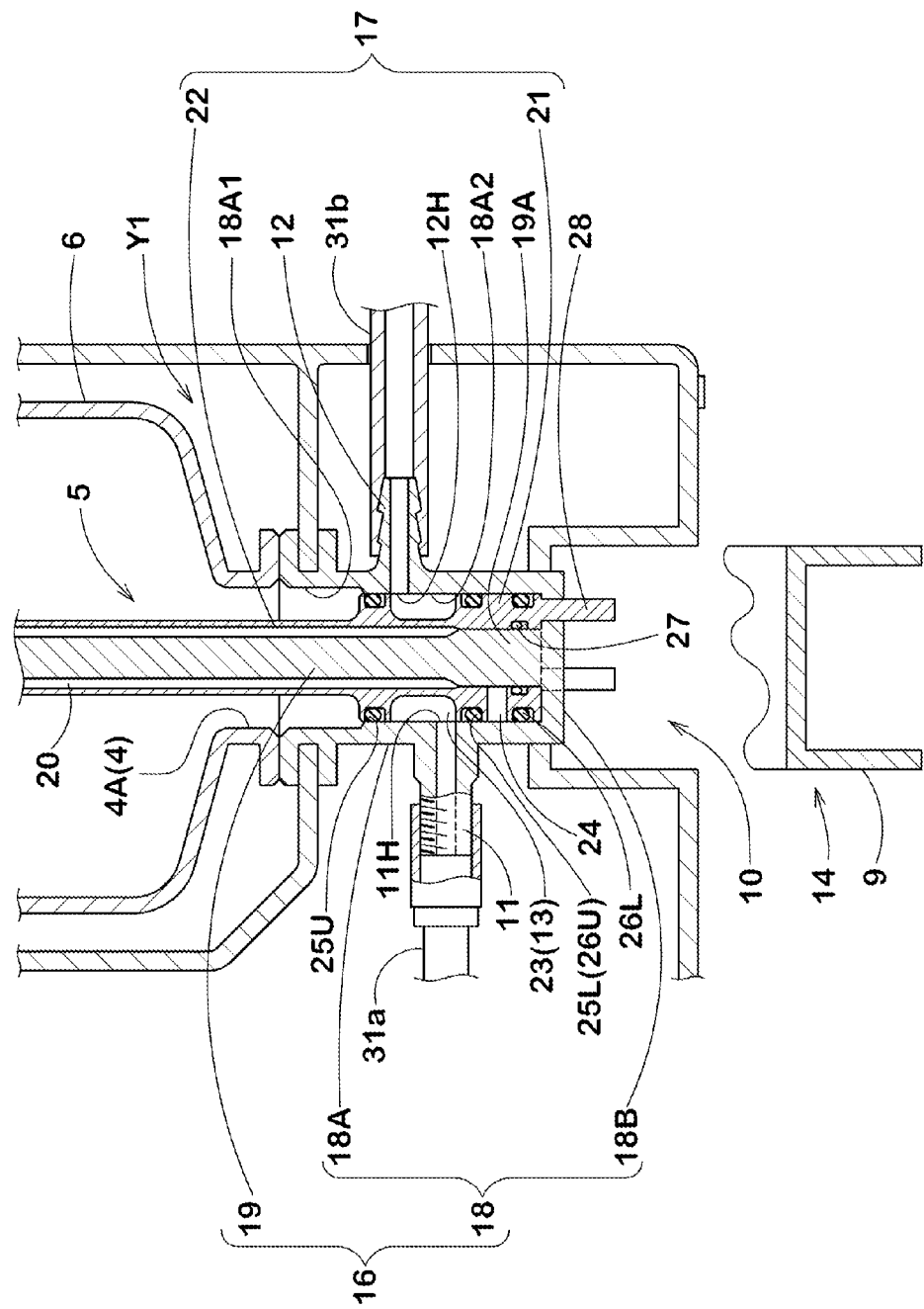
FIG. 3 is a cross-sectional view showing in further enlarged dimension an extraction cap in normal time.

To be specific, the extraction cap 5 of the present embodiment includes a cap body 16 and a mobile body 17 as shown in enlarged dimension in FIG. 3. The cap body 16 integrally includes a barrel portion 18 and a support portion 19. The barrel portion 18 includes a tubular portion 18A whose upper end is secured to the mouth portion 4A of the bottle container 4, and a bottom portion 18B to be coupled to a lower end of the tubular portion 18A. The support portion 19 extends upward from the bottom portion 16B and coaxially with the tubular portion 18A. An upper end of the support portion 19 is terminated in the bottle container 4.

In the cap body 16 of the present embodiment, the tubular portion 18A and the mouth portion 4A are secured to each other by welding. Alternatively, both may be secured to each other by various methods, such as adhesive, or screwing.

An inner wall surface of the tubular portion 18A includes a large diameter wall portion 18A1 having a large inner diameter, and a small diameter wall portion 18A2 having a small inner diameter that is continuous with a lower side of the large diameter wall portion 18A1 with a step portion interposed therebetween. An opening of the inlet mouth portion 11 and an opening of the outlet mouth portion 12 are disposed in the small diameter wall portion 18A2. An opening 11H of the inlet mouth portion 11 is located lower than an opening 12H of the outlet mouth portion 12.

The support portion 19 has, at a lower end portion thereof, a large diameter positioning portion 19A to coaxially position the mobile body 17. A first clearance portion 20 extending upward between the support portion 19 and the mobile body 17 is defined above the positioning portion 19A. An upper end of the positioning portion 19A is terminated below the opening 11H of the inlet mouth portion 11.

The inlet mouth portion 11 and the compressor 3 need to permit easy attachment and detachment so that a user can replace the bottle unit 6. In the present embodiment, the inlet mouth portion 11 is formed of a nipple fitting screwable to a tip portion of a hose 31a extending from the compressor 3. Hence, it is unnecessary for the user to remove a hose 31b for coupling a tire from the outlet mouth portion 12. According to the present embodiment, the outlet mouth portion 12 is formed of a barb fitting.

The mobile body 17 is externally inserted in and held by the support portion 19 so as to be vertically movable relative to the support portion 19. In the present embodiment, the mobile body 17 is made up of a piston portion 21 and a small diameter sheath pipe portion 22. The piston portion 21 is brought into airtight contact with the small diameter wall portion 18A2. The sheath pipe portion 22 extends upward from the piston portion 21 and coaxially therewith.

The sheath pipe portion 22 has approximately the same height as the support portion 19. In the present embodiment, an upper end of the sheath pipe portion 22 and an upper end of the support portion 19 are located above a fluid surface TS of the puncture repair fluid T so as to prevent backflow of the puncture repair fluid T into the first clearance portion 20.

The piston portion 21 has, on an outer peripheral surface thereof, a circumferential groove-shaped recessed portion 23 and a through hole portion 24. The through hole portion 24 is to permit, below the recessed portion 23, communication between an outer peripheral surface side and an inner peripheral surface side of the piston portion 21. First upper and lower seal rings 25U and 25L are disposed on the outer peripheral surface of the piston portion 21, which are respectively located above and below the recessed portion 23. The first upper and lower seal rings 25U and 25L are to be airtightly contacted with the small diameter wall portion 18A2. Second upper and lower seal rings 26U and 26L are disposed on the outer peripheral surface of the piston portion 21, which are respectively located above and below the through hole portion 24. The second upper and lower seal rings 26U and 26L are to be airtightly contacted with the small diameter wall portion 18A2. In the present embodiment, the first lower seal ring 25L is also used as the second upper seal ring 26U. Further in the present embodiment, a third seal ring 27 is disposed on an inner peripheral surface of the piston portion 21 and is located below the through hole portion 24. The third seal ring 27 is to be airtightly contacted with the positioning portion 19A.

As shown in FIG. 2, the puncture repair kit 1 of the present embodiment includes holding means 32 that holds the bottle unit 6 at a certain height in the housing case 2. In the present embodiment, the holding means 32 is made up of a circumferential groove-shaped engaging groove 32A formed around an outer periphery of the barrel portion 18, and an engaging plate portion 32B disposed in the housing case 2 and fitted to and engaged with the engaging groove 32A.

As shown in FIG. 3, in a normal state Y1, the mobile body 17 is held at a lower limit position at which a lower surface of the piston portion 21 is contacted with an upper surface of the bottom portion 18B. At this time, the opening 11H of the inlet mouth portion 11 communicates with the recessed portion 23, and the recessed portion 23 communicates with the opening 12H of the outlet mouth portion 12. Thus in the present embodiment, the recessed portion 23 defines the air-dedicated flow passage 13 that does not pass through the interior of the bottle container 4.

A projected piece 28 that projectedly extends downward through the bottom portion 18B is disposed at a lower end of the piston portion 21. Upon securing the switching cap 9 to the securing recessed portion 10, a lower end of the projected piece 28 is brought into contact with an upper surface 9S of the switching cap 9 so as to push up the mobile body 17.

Figure 4:
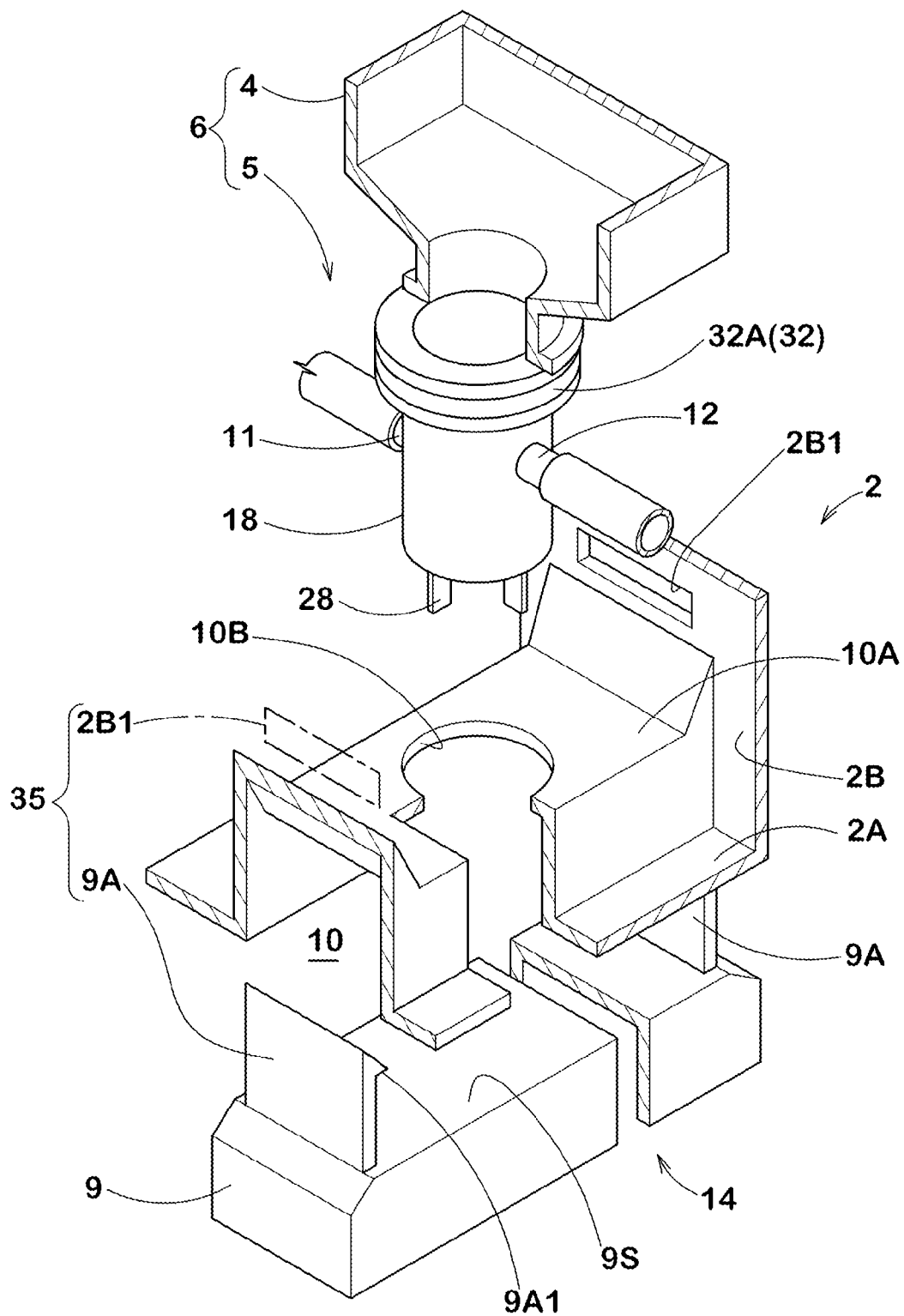
FIG. 4 is an exploded perspective view showing a securing recessed portion disposed in a housing case and a switching cap secured to the securing recessed portion.

As shown in FIG. 4, the securing recessed portion 10 of the present embodiment has a rectangular cross section and extends in a front-to-back direction perpendicular to the lateral direction. Specifically, the securing recessed portion 10 of the present embodiment is formed by bending a bottom plate 2A of the housing case 2 into a U-shape. An upper surface 10A of the securing recessed portion 10 includes an insertion hole 10B that permits insertion of the cap body 16 so as to prevent misregistration thereof. A lower end portion of the cap body 16 is located below the insertion hole 10B.

The switching cap 9 has a rectangular box shape. The switching cap 9 has the upper surface 9S that is brought into contact with the projected piece 28 so as to push up the mobile body 17 upon securing the switching cap 9 to the securing recessed portion 10. Elastically deformable engaging pieces 9A extending upward from the upper surface 9S are respectively disposed at front and rear end portions of the switching cap 9. Hook claws 9A1 having, for example, a triangular cross section are respectively inwardly projected from the upper ends of the engaging pieces 9A. The hook claws 9A1 are to be engaged with engaging holes 2B1 respectively disposed on front and rear side surfaces 2B of the housing case 2. This ensures retention of a secured state Y2 between the switching cap 9 and the securing recessed portion 10 (hereinafter generally referred to as "switching cap secured state Y2"). According to the present embodiment, the engaging pieces 9A and the engaging holes 2B1 constitute switching retention means 35 for retaining the switching cap 9 in the switching cap secured state Y2.

Figure 6:
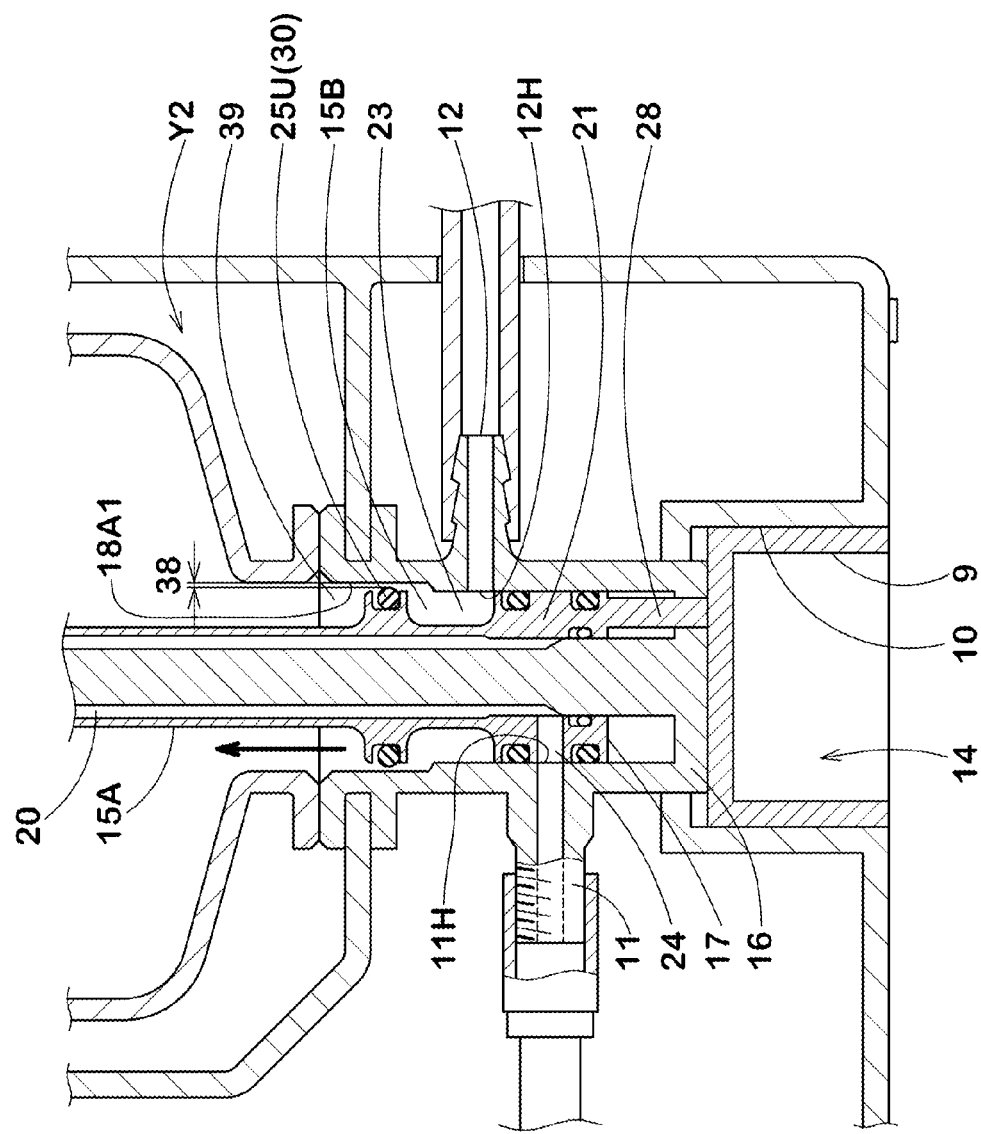
FIG. 6 is a cross-sectional view showing in further enlarged dimension an extraction cap at the time of switching.

In the switching cap secured state Y2, the opening 11H of the inlet mouth portion 11 communicates with the through hole portion 24 as shown in enlarged dimension in FIG. 6. The through hole portion 24 communicates with the first clearance portion 20. According to the present embodiment, the through hole portion 24 and the first clearance portion 20 define the first flow passage portion 15A that allows the inlet mouth portion 11 to communicate with the interior of the bottle container 4.

In the switching cap secured state Y2, the first seal ring 25U is opposed to the large diameter wall portion 18A1 so as to define a second clearance portion 38 between the piston portion 21 and the large diameter wall portion 18A1. The second clearance portion 38 is to communicate with the opening 12H of the outlet mouth portion 12 with the recessed portion 23 interposed therebetween. According to the present embodiment, space 39 between the sheath pipe portion 22 and the large diameter wall portion 18A1, the second clearance portion 38, and the recessed portion 23 define the second flow passage portion 15B that allows the interior of the bottle container 4 to communicate with the outlet mouth portion 12.

In the normal state Y1, the first upper and lower seal rings 25U and 25L close the second clearance portion 38 so as to close the second flow passage portion 15B. In the switching cap secured state Y2, the first upper and lower seal rings 25U and 25L open the second clearance portion 38 so as to open the second flow passage portion 15B. Accordingly, the first upper and lower seal rings 25U and 25L define the first on-off valve 30.

In the present embodiment, the projected piece 28, the mobile body 17, the switching cap 9, the securing recessed portion 10, and the switching retention means 35 constitute the switching means 14 for switching between the air-dedicated flow passage 13 and the puncture repair-dedicated flow passage 15.

In the present embodiment, as shown in FIGS. 7(A) and 7(B), a misregistration prevention portion 40 is defined on an upper end of the support portion 19. The misregistration prevention portion 40 is to prevent upward misregistration of the mobile body 17 in the normal state Y1. The misregistration prevention portion 40 is, for example, a projection 40a of a semicircular arc shape in cross section that projects at a small height from the outer peripheral surface of the support portion 19. The upper end of the sheath pipe portion 22 is brought into contact with the projection 40a so as to prevent the upward misregistration of the mobile body 17. The sheath pipe portion 22 is movable upward beyond the projection 40a by a strong push-up force from the switching cap 9.

A second on-off valve 41 to close the first flow passage portion 15A in the normal time is defined at an upper end portion of the support portion 19. The second on-off valve 41 is a seal ring 41a disposed around an outer periphery of the support portion 19. An aperture portion 43 is disposed at an upper end portion of the sheath pipe portion 22. The aperture portion 43 is brought into contact with the seal ring 41a so as to close the first clearance portion 20. In the switching cap secured state Y2, the aperture portion 43 is moved upward and not contacted with the seal ring 41a so as to open the first clearance portion 20 (the first flow passage portion 15A).

Figure 8:
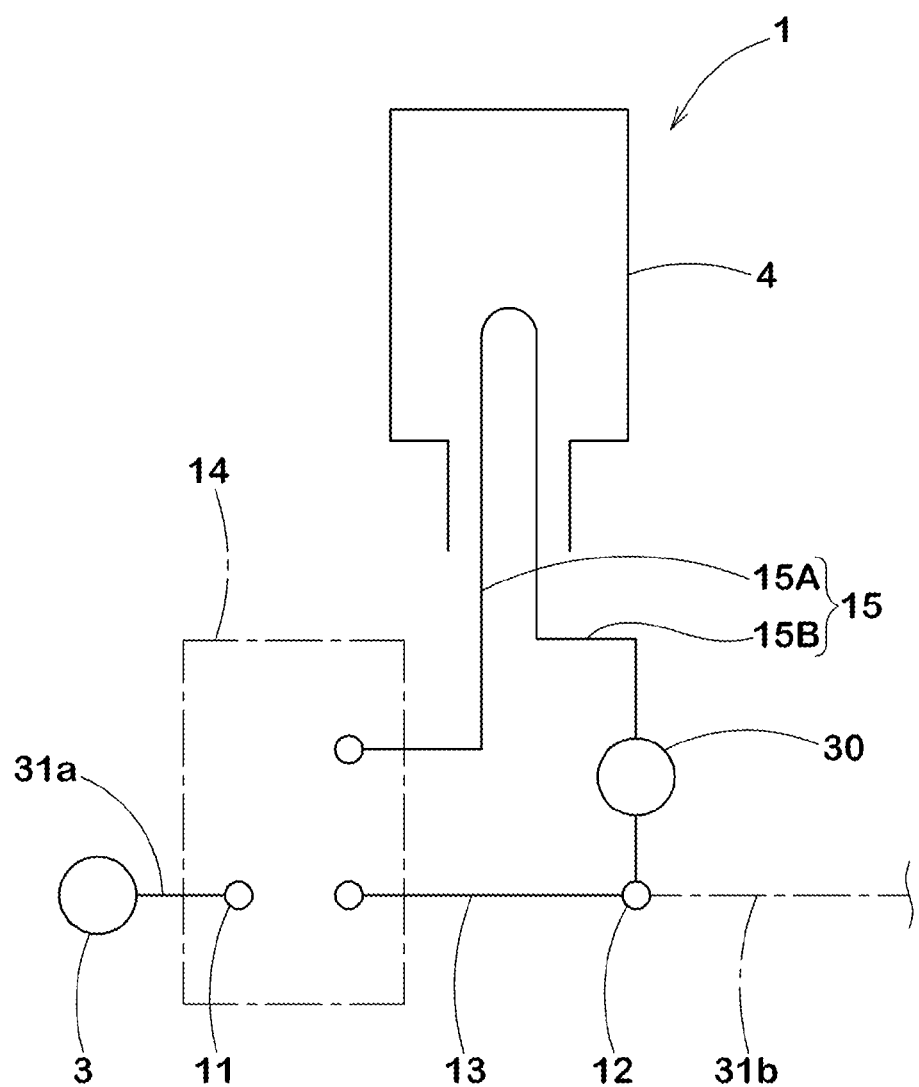
FIG. 8 is a conceptual view showing in a simplified manner a flow passage structure in the puncture repair kit of the present invention.
Figure 9:
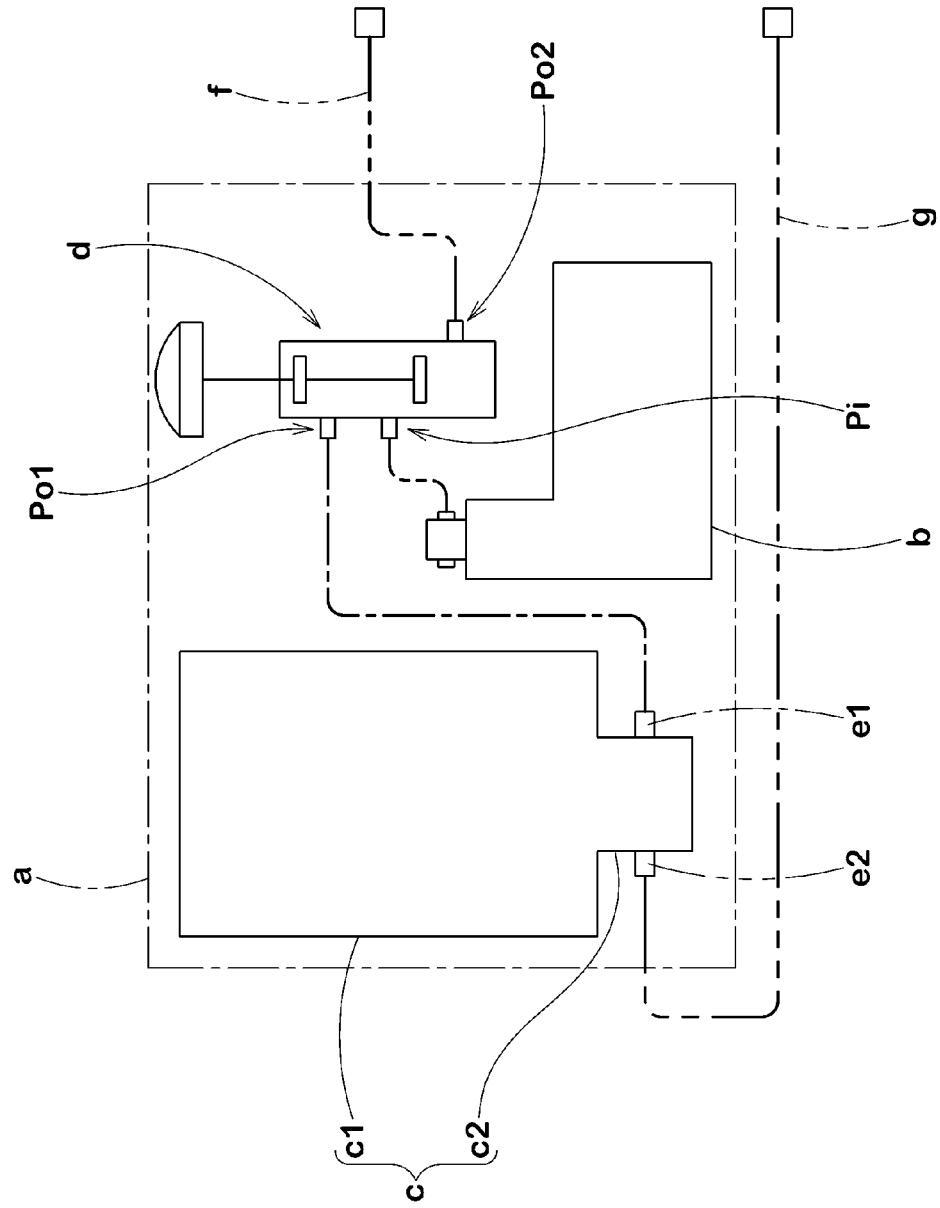
FIG. 9 is a conceptual view showing in a simplified manner a flow passage structure in a conventional puncture repair kit.

FIG. 8 is a conceptual view showing in a simplified manner a flow passage structure in the puncture repair kit 1 of the present invention.

Although the particularly preferred embodiment of the present invention has been described in detail, the present invention can be modified and carried out in various embodiments without being limited to the illustrated embodiment.

DESCRIPTION OF THE REFERENCE NUMERAL

1 Integrated flat tire repair kit
2 Housing case
3 Compressor
4 Bottle container
4A Mouth portion
5 Extraction cap
6 Bottle unit
9 Switching cap
10 Securing recessed portion
11 Inlet mouth portion
12 Outlet mouth portion
13 Air-dedicated flow passage
14 Switching means
15 Puncture repair-dedicated flow passage
15A First flow passage portion
15B Second flow passage portion
16 cap body
17 Mobile body
18 Barrel portion
18A Tubular portion
18A1 Large diameter wall portion
18A2 Small diameter wall portion
18B Bottom portion
19 Support portion
20 First clearance portion
21 Piston portion
22 Sheath pipe portion
23 Recessed portion
Through hole portion
25U, 25L upper and lower seal rings
28 Projected piece
30 First on-off valve
38 Second clearance portion
41 Second on-off valve
T Puncture repair fluid
TS Fluid surface

What is claimed is:
1. An integrated flat tire repair kit comprising:
a compressor housed in a housing case and configured to discharge compressed air; and
a bottle unit housed in the housing case and comprising an extraction cap secured to a mouth portion of a bottle container storing a puncture repair fluid,
wherein the extraction cap comprises:

an inlet mouth portion configured to take the compressed air from the compressor into the extraction cap;

an outlet mouth portion configured to discharge the taken compressed air or both of the compressed air and the puncture repair fluid to outside the extraction cap;

an air-dedicated flow passage configured to be coupled to the inlet mouth portion in normal time so as to allow the inlet mouth portion to communicate with the outlet mouth portion without passing through an interior of the bottle container;

a puncture repair-dedicated flow passage comprising a first flow passage portion and a second flow passage portion, the first flow passage portion being configured to be coupled to the inlet mouth portion instead of the flow passage dedicated to air by a switch so as to allow the inlet mouth portion to communicate with the interior of the bottle container, the second flow passage portion being configured to allow the interior of the bottle container to communicate with the outlet mouth portion;

a first on-off valve interposed in the second flow passage portion and configured to close the second flow passage portion in the normal time;

the switch, wherein the switch comprises a switching cap and is configured to be operated upon securing the switching cap to the housing case so as to allow a coupling destination of the inlet mouth portion to be switched from the air-dedicated flow passage to the puncture repair-dedicated flow passage, and the switch is configured to release the first on-off valve so as to open the second flow passage portion; and a cap body integrally comprising:
 a barrel portion comprising a tubular portion whose upper end is secured to the mouth portion of the bottle container, and a bottom portion configured to close a lower end of the tubular portion;
 a support portion extending upward from the bottom portion and coaxially with the tubular portion so as to reach the interior of the bottle container; and
 a mobile body externally inserted in and held by the support portion so as to be vertically movable relative to the support portion, wherein the first on-off valve is disposed in the mobile body so as to be integrally movable with the mobile body, and wherein an upward movement of the mobile body allows a coupling destination switching from the air-dedicated flow passage to the puncture repair-dedicated flow passage, and allows release of the first on-off valve.

2. The integrated flat tire repair kit according to claim 1, wherein the housing case comprises a securing recessed portion disposed on a bottom portion of the housing case, and the switch is configured to be operated upon securing the switching cap to the securing recessed portion.

3. The integrated flat tire repair kit according to claim 1, wherein an inner wall surface of the tubular portion comprises a large diameter wall portion having a large inner diameter, and a small diameter wall portion having a small inner diameter and being continuous with a lower side of the large diameter wall portion with a step portion interposed therebetween,
wherein the mobile body comprises a piston portion configured to be airtightly contacted with the small diameter wall portion, and a sheath pipe portion extending from the piston portion and coaxially with the piston portion,
wherein the piston portion comprises a circumferential groove shaped recessed portion disposed on an outer peripheral surface of the piston portion, and a through hole portion disposed below the recessed portion and configured to permit communication between an outer peripheral surface side and an inner peripheral surface side of the piston portion,
wherein the air-dedicated flow passage is defined by the recessed portion, and
wherein the first flow passage portion of the puncture repair-dedicated flow passage comprises the through hole portion and a first clearance portion between the sheath pipe portion and the support portion, and the second flow passage portion of the puncture repair-dedicated flow passage comprises the recessed portion and a second clearance portion between the piston portion and the large diameter wall portion.

4. The integrated flat tire repair kit according to claim 1, wherein the switch comprises a projected piece projectedly extending downward from a lower end of the mobile body and passing through the bottom portion, and upon securing the switching cap to the housing case, the switching cap is configured to contact with a lower end of the projected piece so as to push up the mobile body.

5. The integrated flat tire repair kit according to claim 3, wherein the first on-off valve comprises an upper seal ring and a lower seal ring disposed on an outer peripheral surface of the piston portion and respectively located above and below the recessed portion, and
wherein in the normal time, the upper seal ring and the lower seal ring are brought into close contact with the small diameter wall portion so as to close the second flow passage portion, and the upward movement of the mobile body allows the upper seal ring to be opposed to the large diameter wall portion so as to open the second flow passage portion.

6. The integrated flat tire repair kit according to claim 3, wherein an upper end of the support portion and an upper end of the sheath pipe portion are located above a fluid surface of the puncture repair fluid.

7. The integrated flat tire repair kit according to claim 3, wherein a second on-off valve configured to close the first flow passage portion in the normal time is disposed at an upper end portion of the support portion, and the second on-off valve is configured to open the first flow passage portion upon the upward movement of the mobile body.

8. The integrated flat tire repair kit according to claim 3, wherein the switch comprises a projected piece projectedly extending downward from a lower end of the mobile body and passing through the bottom portion, and upon securing the switching cap to the housing case, the switching cap is configured to contact with a lower end of the projected piece so as to push up the mobile body.

9. The integrated flat tire repair kit according to claim 4, wherein the first on-off valve comprises an upper seal ring and a lower seal ring disposed on an outer peripheral surface of the piston portion and respectively located above and below the recessed portion, and
wherein in the normal time, the upper seal ring and the lower seal ring are brought into close contact with the small diameter wall portion so as to close the second flow passage portion, and the upward movement of the mobile body allows the upper seal ring to be opposed to the large diameter wall portion so as to open the second flow passage portion.

10. The integrated flat tire repair kit according to claim 4, wherein an upper end of the support portion and an upper end of the sheath pipe portion are located above a fluid surface of the puncture repair fluid.

11. The integrated flat tire repair kit according to claim 5, wherein an upper end of the support portion and an upper end of the sheath pipe portion are located above a fluid surface of the puncture repair fluid.

12. The integrated flat tire repair kit according to claim 4, wherein a second on-off valve configured to close the first flow passage portion in the normal time is disposed at an upper end portion of the support portion, and the second on-off valve is configured to open the first flow passage portion upon the upward movement of the mobile body.

13. The integrated flat tire repair kit according to claim 5, wherein a second on-off valve configured to close the first flow passage portion in the normal time is disposed at an upper end portion of the support portion, and the second on-off valve is configured to open the first flow passage portion upon the upward movement of the mobile body.

14. The integrated flat tire repair kit according to claim 6, wherein a second on-off valve configured to close the first flow passage portion in the normal time is disposed at an upper end portion of the support portion, and the second on-off valve is configured to open the first flow passage portion upon the upward movement of the mobile body.

\* \* \* \* \*